United States Patent [19]

Lawrence

[11] Patent Number: 4,917,430

[45] Date of Patent: Apr. 17, 1990

[54] PICKUP TRUCK CONVERSION

[76] Inventor: Michael A. Lawrence, 47889 Mt. Vesuvius, Utica, Mich. 48087

[21] Appl. No.: 206,594

[22] Filed: Jun. 14, 1988

[51] Int. Cl.$^4$ ............................................. B60R 11/06
[52] U.S. Cl. ................................... 296/376; 296/190; 224/281; 224/42.44
[58] Field of Search .................... 296/24.1, 37.1, 37.6, 296/37.16, 146, 190, 183, 37.15; 224/275, 281, 42.42, 42.44

[56] References Cited

U.S. PATENT DOCUMENTS

| | | | |
|---|---|---|---|
| 1,455,549 | 5/1923 | Robison | 224/42.42 |
| 1,632,360 | 6/1927 | Wilson | 296/24.1 |
| 1,990,757 | 2/1935 | Stiles | 296/37.1 X |
| 2,365,940 | 12/1944 | Couse | 296/24.1 |
| 2,455,417 | 12/1948 | Holan et al. | 296/24.1 |
| 2,502,963 | 4/1950 | Klee | 224/275 |
| 2,530,578 | 11/1950 | Hotop | 296/24.1 |
| 2,744,667 | 5/1956 | Maloney | 224/275 |
| 2,784,027 | 3/1957 | Temp | 296/37.6 X |
| 4,159,844 | 7/1979 | Weiner | 296/37.1 |
| 4,681,360 | 7/1987 | Peters et al. | 296/37.6 |
| 4,705,315 | 11/1987 | Cherry | 296/37.1 |
| 4,733,898 | 3/1988 | Williams | 296/37.6 X |

FOREIGN PATENT DOCUMENTS

| | | |
|---|---|---|
| 236740 | 7/1911 | Fed. Rep. of Germany . |
| 3503967A1 | 8/1986 | Fed. Rep. of Germany . |
| 768133 | 7/1934 | France ........................ 296/37.15 |
| 533579 | 2/1941 | United Kingdom ............... 296/37.1 |
| 2124189 | 2/1984 | United Kingdom ............... 224/275 |

OTHER PUBLICATIONS

Automobile Engineer, Nov. 1959, pp. 412 and 413.
The Commerical Car Journal, May 15, 1925.
"American Van Equipment, Inc." 1984.

*Primary Examiner*—Dennis H. Pedder
*Attorney, Agent, or Firm*—Gifford, Groh, Sheridan, Sprinkle and Dolgorukov

[57] ABSTRACT

There is disclosed a pickup truck conversion and a method of providing the same involving placing an access opening in the side wall of the pickup truck between the door and the rear-wall of the cab. In axial alignment with said access opening there is provided a frame assembly filling all or part of the space between the side walls and the rear-seat of the truck. The frame assembly defines a storage area therewithin, which can accept various storage means such as hinged storage boxes, various sliding drawers, tool boxes, a work bench, and the like, which are removable and which are slideably mounted within the frame assembly to provide easy access to the stored materials from outside of the pickup truck.

19 Claims, 4 Drawing Sheets

PICKUP TRUCK CONVERSION

BACKGROUND OF THE INVENTION

1. Field of the Invention

The present invention relates to truck conversions, and more particularly to a conversion for extended cab pickup trucks having a storage area between the seat and the rear-wall of the truck. The conversion is provided by providing an access opening in the side wall of the pickup cab behind the seat thereof, i.e., between the door and the rear-wall. A frame assembly in axial alignment with the access opening is provided which fills some, or all of the storage area behind the seat, and various storage means are provided within said frame means.

2. Description of the Prior Art

The pickup truck has long been popular with a wide variety of users for the versatility it provides. Such users range from contractors, who use the truck for work everyday, to commuters, who use the truck for going to work during the week, and on weekends for sporting activities. In recent years, the need for additional storage space in such pickup trucks has become evident, because the trucks do not have the trunks of conventional automobiles. A wide variety of storage boxes to be placed in the pickup bed were first thought to be a solution to these problems, but these boxes were exposed to the elements and in some cases would leak damaging the contents therein, and they were also prone to theft by being located outside the truck. However, they proved to be popular as there was not any alternative to the bed mounted storage box until the advent of the extented cab pickup truck. The extended cab pickup truck was thought to provide a solution to the need for additional storage by extending the cab of a normal pickup truck and providing an open storage area behind the seat of the truck. However, not much efficient utilization has been made of this space to the best of my knowledge. I am aware that some manufacturers of Extended Cab Pickups offer small sideways facing rear seats for use in carring children, for example. But other than this, mostly the space is just left wide open for the user of the truck to fill with whatever gear he has, where it is free to slide around while the vehicle is in motion, sometimes becoming damaged thereby, and also posing a safety problem when the vehicle comes to a sudden stop. Until my invention, there has been no method for efficient utilization of this space.

SUMMARY OF THE INVENTION

In order to provide a method and a structure for efficient utilization of this storage area in an extended cab pickup, I place an access opening in the sidewall of the pickup truck between the door and the rear wall of the cab. In axial alignment with said access opening, and thus transverse to the axis of the truck, I provide a frame assembly filing all or part of the space between the side walls and the rear seat of the truck. The frame assembly defines a storage area within the frame assembly, which can accept various storage means, such as a hinged storage box which fits in the top section of the frame assembly and is not removable through said access opening, to various sliding drawers, tool boxes, work benches, etc, which are removable, and which are slideably mounted within the frame assembly, to provide easy access to the stored materials from outside the pickup truck. For purposes of illustration, I have shown an access opening provided on the passenger side of an extended cab pickup truck with various storage means, although my invention can also be used in extended cab pickups having access openings on both sides of the truck, and with a wide variety of accessories, as will be described hereinafter.

Thus, it is an object of the present invention to provide a method of converting an extended cab pickup truck to provide more efficient utilization of the storage space therein.

It is a further object of the present invention to provide a pickup truck conversion providing for efficient utilization of the storage area of an extended cab pickup truck.

It is a further object of the present invention to provide a pickup truck conversion having a wide variety of accessories storable within a frame assembly while said truck is in motion, but which are easily accessible and/or removeable through an access opening in the side wall of the pickup when said vehicle is stopped.

It is a further object of the present invention to provide a uniquely constructed storage drawer, which may be sildeably mounted in the frame assembly of said pickup conversion.

It is a further object of the present invention to provide a portable work bench, which is storable in said pickup truck conversion, but is easily extended through an access opening and secured in place for use outside said pickup truck.

It is a further object of the present invention to provide a truck conversion of the foregoing nature which provides a large number of storage drawer options which are designed so they may be removed and exchanged with other options, or removed altogether to provide a large bulk cargo space.

It is a further object of the present invention to provide various embodiments of pickup truck conversions manufactured according to the foregoing method.

It is still a further object of the present invention to provide a pickup truck conversion which is relatively simple to manufacture and install.

It is a further object of the present invention to. provide a truck conversion having a lockable access opening which is not visable from outside the truck equipped with said truck conversion.

Further objects and advantages of the present invention will be apparent from the following description and appended claims, reference being made to the accompanying drawings forming a part of the specification, wherein like reference characters designate corresponding parts in the several views.

It is to be understood that the present invention is not limited in its application to the details of the construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRRED EMBODIMENTS

Figure 1:
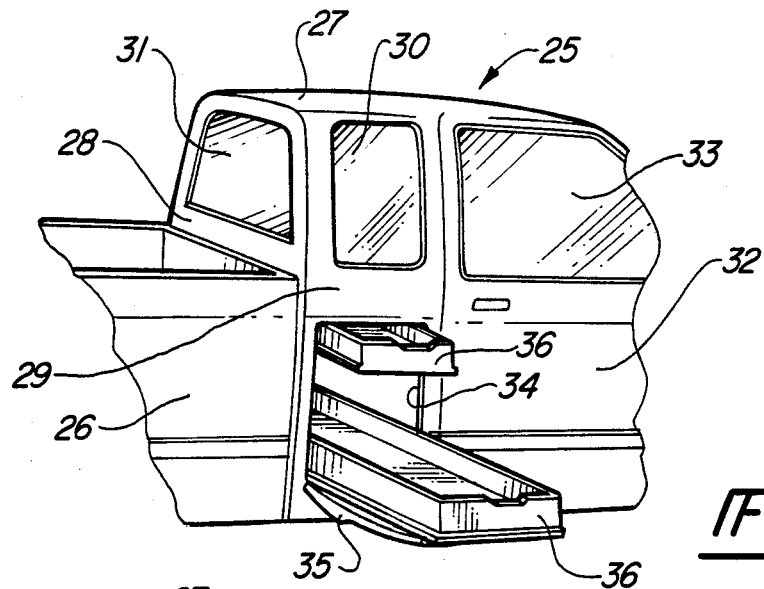
FIG. 1 is a cut away perspective view showing one embodiment of my invention provided in a extended cab pickup truck.

Refering now to FIG. 1, there is shown a cut away perspective view of a typical extended cab pickup truck generally designated by the numeral 25. Such a truck will have a box portion 26, and a cab portion 27. The cab 27 will have a rear wall 28 having a back lite 31 mounted therein, and will have side walls 29, and side lites 30 mounted therein. Also, there is mounted a door 32 having a window 33 therein. An access opening 34 is provided according to my invention in the lower portion of the side wall 29 between the door 32 and the rear wall 28. The access door 35 provides for closure of the access opening 34, and may be hinged either on the bottom or side thereof, as will be explained further.

Figure 2:
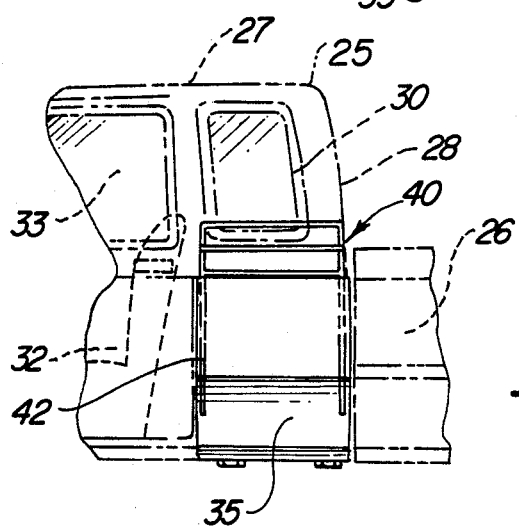
FIG. 2 is a side elevational view of the construction shown in FIG. 1, with the truck body, except for the access door, shown in phantom lines.
Figure 3:
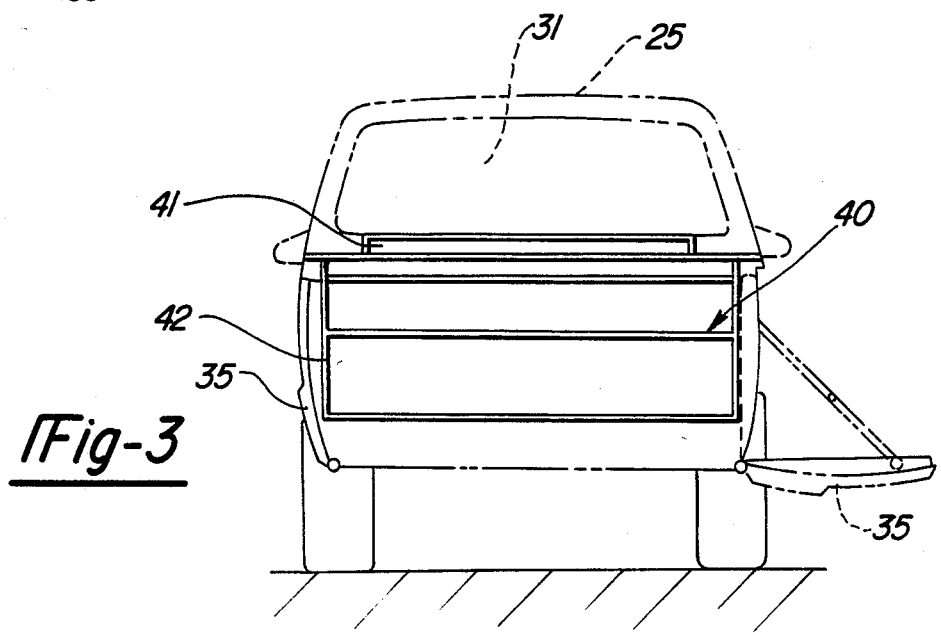
FIG. 3 is a rear elevational view of the construction shown in FIG. 1, with the truck body shown in phantom lines.

Referring now to FIG. 2, the position of the frame assembly of the present invention, generally designated by the numeral 40, can be seen within the truck body, the frame assembly 40, and the access door 35 being shown in solid lines, as these are considered part of the present invention, while the truck body 25 is not. It can be seen that the frame assembly defines a storage area therein, and has an upper portion 41, and a lower portion 42, with the lower portion being accessible from the access door 35 through the access opening 34. Additional information concerning the frame assembly can be seen by referring to FIG. 3, which is a rear elevational view of the pickup truck 25. In this view, the access door 35 is shown in phantom lines in its open position.

For purposes of illustration, the remaining figures are shown with the truck body removed so that the operation of my invention may be more clearly understood.

Figure 6:
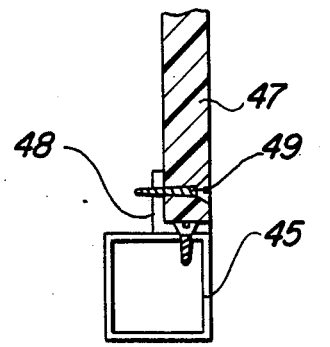
FIG. 6 is a partial sectional view, taken in the direction of the arrows, along the Section Line 6—6 of FIG. 4.
Figure 7:
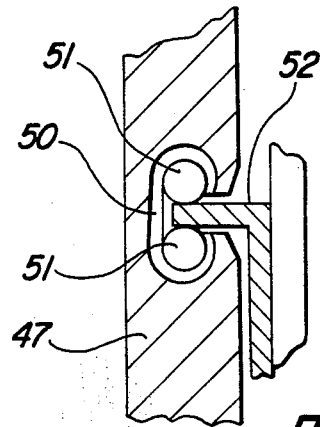
FIG. 7 is a partial sectional view, taken in the direction of the arrows, along the Section Line 7—7 of FIG. 5.

Refering now to FIG. 4–7, the details of construction of my truck conversion can be seen. The frame assembly generally designated by the numeral 40 includes an upper portion 41 defining an upper storage area, which is the portion above the perimeter railing 43, and a lower portion 42 below said perimeter rail defining a lower storage area. The frame assembly, as can be seen in FIG. 6, is preferably formed of a plurality rectangular steel channel 45 welded to a plurality of upright channels 46, which in the perferred embodiment is welded together in the form shown to form a pair of axially entending opposed wall surfaces, but it should be understood a wide variety of fastening means may be used to hold the frame assembly together. To the inside of opposed wall surfaces, a pair of slide assemblies 47 are mounted to provide a support means for the various storage means to be described hereinafter.

As shown in FIG. 6, a pair of slide assemblies 47 are mounted in a 180 degree opposed (facing) relationship to the upright channels 46, and the horizontal channels 45, to form interior walls for the frame assembly by virtue of the angles 48 being screwed, or otherwise fastened, to the uprights 46 and channels 45, and the slide assemblies 47 being in turn screwed to angles 48 by means of the screws or other fastening devices 49. Imbedded in the slide assemblies, in a 180 degree mutually opposed relationship are at least one pair of bearing races 50 having opposed rows of ball bearings 51 entrapped therein which accept slide channels 52.

In the preferred embodiment, the slide assemblies 47 are extruded plastic, with the bearing races 50 fitting into channels extruded in the plastic. However, it should be understood that the slide assemblies can be made of any practicable material, and the bearing races can be mounted to one of the exterior surfaces of the slide assembly 47, if desired. A pair of exterior trim panels 55, which are preferably removably attached for reasons to be described hereinafter, are mounted exteriorly of the upright channels 46, and horizontal channels 45, to prevent the debris from entering the storage area defined by the frame assembly 40 during normal operation. However, the trim panels 55 are preferably easily removeable in case access is needed to the storage area during normal operation of the vehicle.

It is contemplated however, that things which may need to be reached during the operation of the vehicle may be placed in storage tray 60, which is made of the proper size to fit between the horizontal channels 45 and upright channels 46 within the upper portion 41 of the frame assembly 40. It is to be noted that the upright channels 46 on the upper portion 41 of the frame assembly are moved inwardly from the upright channels 46 on the lower portion 42 of the frame assembly. This is because the portion of a pickup cab above the belt line is traditionally somewhat narrower than the portion below the belt line, and to provide clearance for the cover 61 of the removable storage tray 60, it is necessary that the uprights 46 be moved inwardly sufficiently so the cover 60 will not hit the pickup cab when it is lifted.

To fill the space created by the inward movement of the uprights 46, and the side wall 29 of the pickup cab, fillers 62 may be provided, which extend from uprights 46 to the side wall 29, by virtue of the perimeter rail 63. If desired, the fillers 62 may be made in the form of cupholders 64, as illustrated in FIG. 4.

Figure 4:
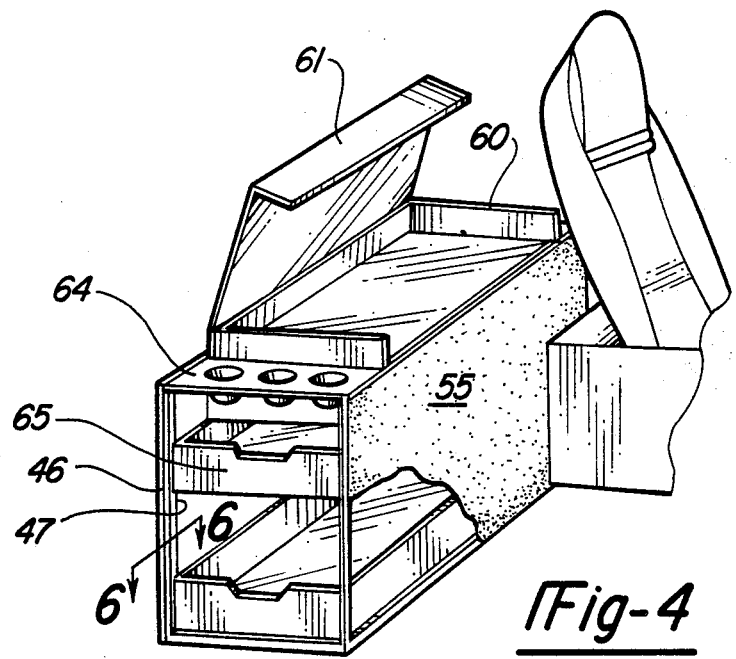
FIG. 4 is a perspective view showing an embodiment of my invention installed in an extended cab pickup truck, with the cab shown removed.
Figure 8:
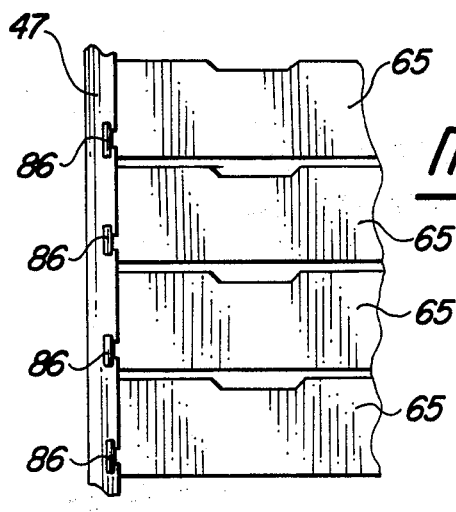
FIG. 8 is a partial elevational view, showing an embodiment of my invention having a plurality of slide out drawers mounted within the storage area defined by the frame assembly of FIG. 5.
Figure 9:
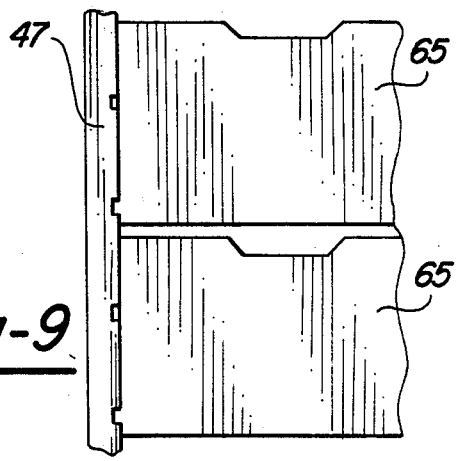
FIG. 9 is a partial elevational view similar to FIG. 8, but is showing only two larger drawers mounted within the frame assembly, rather than four drawers.
Figure 5:
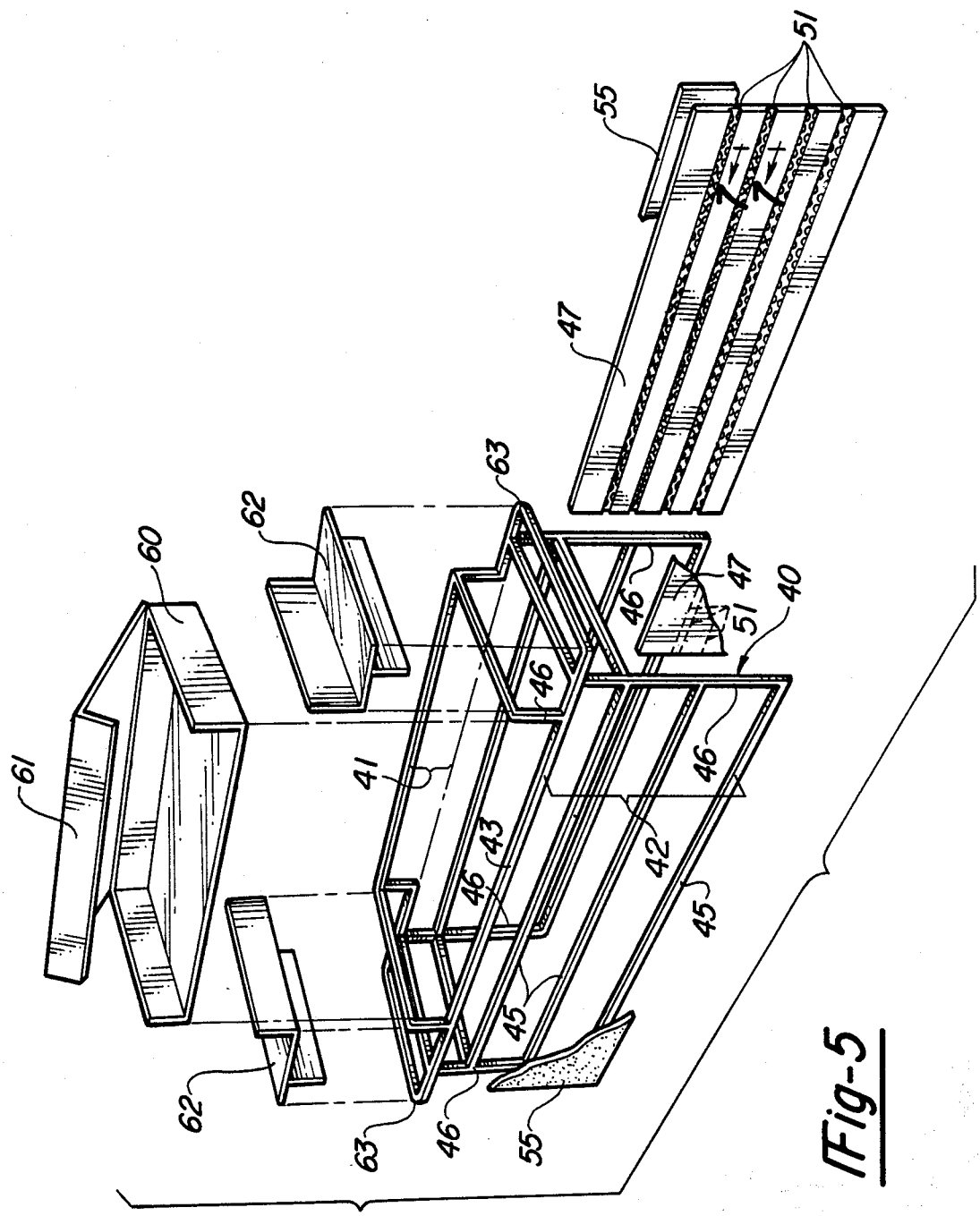
FIG. 5 is an exploded perspective view showing the frame assembly used in one embodiment of my invention.

Referring to FIGS. 4, 8 & 9, it can be seen that a plurality of storage drawers 65 can be mounted in the slide assemblies 47. For ease of illustration, all these drawers have been indicated with the numeral 65, although as can be seen, they can be of varying shapes and sizes. In the preferred embodiment, all of the storage drawers will be constructed according to the embodiment illustrated in FIG. 10.

Figure 10:
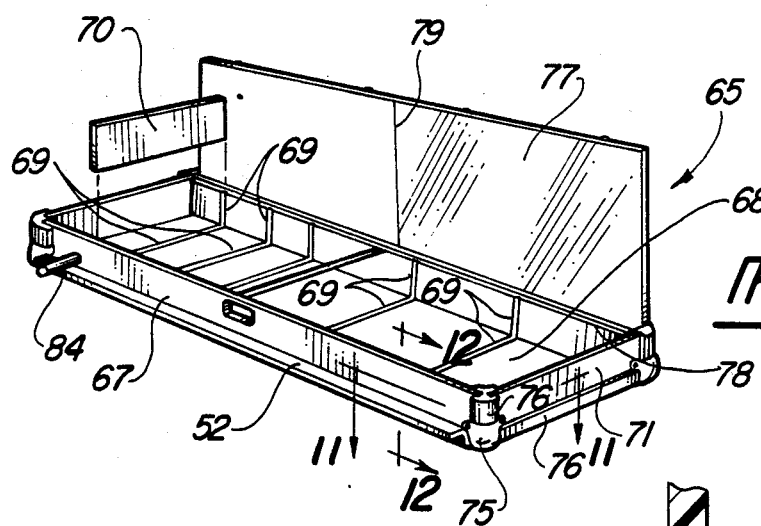
FIG. 10 is a perspective view of one of the drawers shown in FIG. 8.
Figure 11:
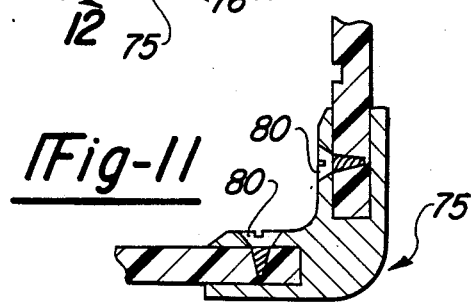
FIG. 11 is a partial sectional view, taken in the direction of the arrows, along the Section Line 11—11 of FIG. 10.
Figure 12:
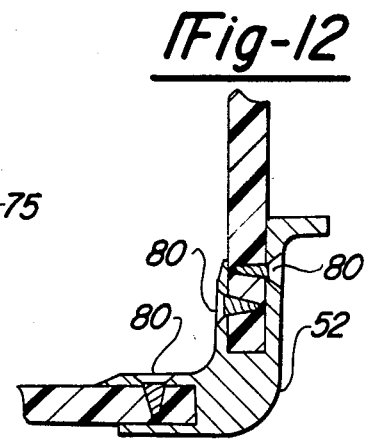
FIG. 12 is a partial sectional view, taken in the direction of the arrows, along the Section Line 12—12 of FIG. 10.

Preferably, each storage drawer 65, no matter what size, is manufactured as shown in FIG. 10. It is preferred that the sides 67 and bottom 68 all be constructed of an opaque extruded material. To provide for the division of the box into convenient storage areas this extruded material will have parallel grooves 69 extruded therein, into which dividers 70 can easily fit. The ends 71 do not need to have these grooves therein. The sides 67, bottom 68, and ends 71 are all held together by means of corner posts 75, slide channels 52 and end channels 76. The main strength of the construction comes from the screws used with the corner posts 75 which screw into the end channel 76 used for the ends and corners, and the slide channels 52. This provides a strong frame into which the ends 71, bottom 68, and sides 67 maybe placed, and screwed into place by short screws 80, or other fastening means. A cover 77 may be provided on each of the storage drawers 65 mounted thereon by a piano hinge 78 or other suitable hinge means. The cover may be split in the middle as shown at 79 if desired. It is preferred that the cover 77 be made of a transparent material for ease of viewing the contents of the drawer 65.

Figure 14:
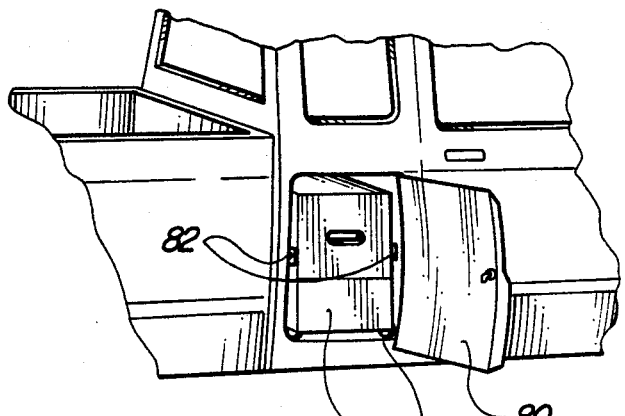
FIG. 14 is a partial perspective view, similar to that shown in FIG. 1, showing another modification of my invention.
Figure 13:
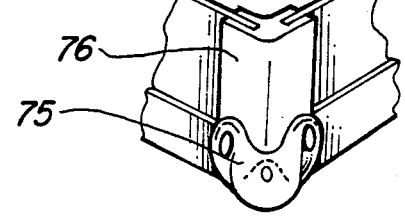
FIG. 13 is a partial perspective view of the construction shown in FIG. 11.

It can be seen that many embodiments of my truck conversion are possible which are still within the scope of the present invention. For example, as shown in FIG. 14, a side opening door 80 may be utilized instead of the bottom opening door 35. If the door were to be attached to a pair of slide channels 52, it can be seen that it is within the scope of the present invention that the door could also operate in a file-cabinet type arrangement. Also, one large storage chest 81 may be utilized, instead of the plurality of small storage drawers 65. In this case, a pair of angles 82 would be mounted to each side of the storage chest 61 in an opposed relationship for sliding engagement with a pair of the bearing races 50. Casters 83 may be placed on the bottom of storage chest 81 to aid in its removal from the frame assembly 40 if desired.

Figure 15:
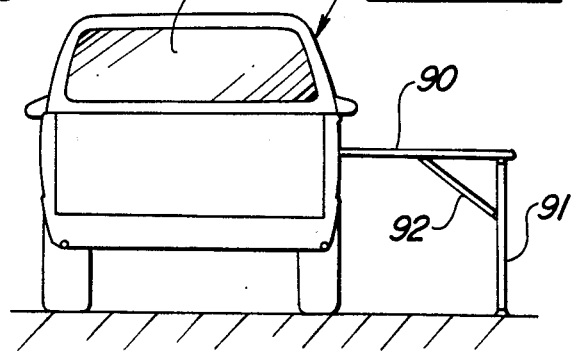
FIG. 15 is a rear elevational view showing a modification of my invention wherein a work bench is slideably mounted within the frame assembly.

For safety purposes, a latch 86 may be provided at the end of each bearing race 50 to prevent excessive forces from being placed on the access doors (35, 80) when the vehicle is going around the corner. These latches also may serve the purpose of preventing removal of the storage means from the bearing races 50, unintentionally by abutting against latch post 84 placed in appropriate manner on the storage drawers. This would prevent accidential removal of the drawer 65 for example, and the work bench 90 shown in FIG. 15. The work bench 90 may be of a thickness and width to slidingly engage the bearing races 50 or, like the storage chest 81, may have an appropriate piece of channel 82 mounted on both sides thereof to engage the bearing races 50. In this case, it is viewed as important to have the latch 86 work in combination with the latch post 84 to prevent removal or accidental dislodgement of the work bench 90 from the bearing race 50 while the work bench 90 is being used by the truck operator. To provide additional support, legs 91 may be mounted by any suitable means to the bottom of work bench 90, and held in working position by brace 92 as long as the work bench is constructed so that the legs 91 may fold up for storage.

Thus, by taking into account the needs of an ever growing number of pickup truck owners, I have provided a novel truck conversion to provide versatile, yet secure storage of items within an extended cab pickup truck, thus, adding to the versatility and attractiveness of the pickup truck as an everyday vehicle for a large number of owners.

I claim:

1. In combination, in a pickup truck of the type having an extended cab with a cab side wall extending between a cab rear wall and a cab door, a side window in the side wall, a seat, and a storage area extending from the behind said seat to the rear wall of said cab, a truck conversion including:
    (a) a frame assembly having its longitudinal axis mounted transverse to the longitudinal axis of said truck between said seat and said rear wall, said frame assembly defining a storage area therewithin,
    (b) an access-opening provided in at least one of said side walls spaced below said side window, said access opening adjacent to, and in axial alignment with, said frame assembly,
    (c) closure means for said access opening; and
    (d) storage means storable within said storage area defined by said frame assembly and extendable through said access opening.

2. The combination defined in claim 1, wherein said storage area includes:
    (a) an upper storage area defined by an upper portion of said frame assembly; and
    (b) a lower storage area defined by the lower portion of said frame assembly.

3. The combination defined in claim 2, wherein said lower storage area is generally rectangular in nature, and includes a plurality of horizontal channels assembled to a plurality of upright channels to form a pair of longitudinally axially extending opposed wall surfaces.

4. The combination defined in claim 3, and further including a pair of slide assemblies fixedly mounted to the inside of each of said opposed wall surfaces such that said slide assemblies face each other in a mirror image relationship.

5. The combination defined in claim 4, wherein said pair of slide assemblies include at least one pair of axially extending bearing races, each having two parallel, closely spaced, rows of ball bearings contained therein.

6. The combination defined in claim 5, wherein said storage means include an upper storage means in said upper storage area, and an lower storage means said lower storage area.

7. The combination defined in claim 6, wherein said lower storage means include at least one pair of parallel, mutually opposed, longitudinally axially extending slide channels for sliding engagement with said bearing races.

8. The combination defined in claim 7, wherein said lower storage means further includes at least one storage drawer.

9. The combination defined in claim 8, wherein said upper storage means further include at least one removable storage tray.

10. The combination defined in claim 8, wherein each of said storage drawers includes:
(a) a frame assembly including:
  (i) a pair of slide channels,
  (ii) a pair of end channels, and
  (iii) a corner post interposed between each end of a slide channel and each end of an end channel to form a rectangle having upstanding corner posts at each corner thereof,
(b) sides and ends mounted to said corner posts to form two sides and two ends of said storage drawer, and
(c) a bottom for said storage drawer mounted to said end and said slide channels.

11. The combination defined in claim 10, wherein said storage drawers further include:
(a) said bottom having a plurality of transverse, parallel, spaced grooves therein,
(b) said sides having a plurality of like spaced parallel grooves in matching relationship with said grooves in said bottom to accept frame inserts therein, and
(c) frame inserts mounted in said parallel grooves in said sides and said bottom of said storage drawer.

12. The combination defined in claim 10, wherein said storage drawer includes a cover hingedly mounted to one of said sides.

13. The combination defined in claim 12, wherein said storage means comprises a storage tray removably placeable within said upper storage area and having a hinged cover thereon.

14. The combination defined in claim 7, wherein said lower storage means consists of a storage chest.

15. The combination defined in claim 7, wherein said lower storage means consists of a plurality of storage drawers.

16. The combination defined in claim 7, wherein said lower storage means includes a work bench slideably mounted in said lower storage area.

17. The combination defined in claim 1, wherein said closure means includes a door hingedly mounted to said cab, with hinges mounted on the side of said door.

18. The combination defined in claim 1, wherein said closure means includes a door hingedly mounted to said cab, with hinges mounted on the bottom of said door.

19. The combination defined in claim 6, and further including a pair of trim panels removably attached to the outside of said opposed wall surfaces.

* * * * *